United States Patent [19]

Horton

[11] Patent Number: 5,018,844
[45] Date of Patent: May 28, 1991

[54] PASSIVE BEAM DEROTATOR

[75] Inventor: James Horton, Arcadia, Calif.

[73] Assignee: OCA Applied Optics, Inc., Garden Grove, Calif.

[21] Appl. No.: 457,469

[22] Filed: Dec. 27, 1989

[51] Int. Cl.$^5$ .................... G02B 23/02; G02B 26/08; G01B 11/26
[52] U.S. Cl. .................................. 350/486; 350/539; 350/484; 356/138
[58] Field of Search ............... 350/321, 320, 421, 424, 350/539, 574, 577, 622, 286, 287, 484, 486; 356/138

[56] References Cited

U.S. PATENT DOCUMENTS 3,619,027 11/1971 Baker ................................ 350/539
3,876,309 4/1975 Zicaro et al. ...................... 356/138

Primary Examiner—Bruce Y. Arnold
Assistant Examiner—James Phan
Attorney, Agent, or Firm—Joseph R. Dwyer

[57] ABSTRACT

A beam positioning system having two articulated arms with a pentaprism, or equivalent 90 degree prism, and a rotator prism, such as a Pechan prism, appropriately located in the path of a beam from a light source in combination with right angle prisms to maintain the final leg of the beam in orientation with the original orientation of the beam from the light source.

7 Claims, 3 Drawing Sheets

PASSIVE BEAM DEROTATOR

BACKGROUND OF THE INVENTION

1. Field of Invention

This invention relates to optical beam positioning systems.

2. Prior Art

FIG. 1 illustrates a prior art beam positioning system 10 in which a circularly asymmetrical beam 12, having a preferred orientation, is positioned on a die 14 of a semiconductor wafer 16, also called a workpiece, for irradiating each die, or selected dies 14, or portions thereof, in the process of selectively doping dies 14 in the manufacture of integrated circuits.

The problem is that in order to scan the entire wafer 16 and irradiate each selected die 14, the beam 12 must be moved on articulated arms 20 and 22 which disorient (rotate) the beam 12 from its preferred orientation in such a manner that the beam 12 is no longer properly aligned when positioned over a selected die.

FIG. 2 illustrates a die 14 and a rectangular beam 12 and the rotation of the beam as at 12A.

The prior art solution to this problem is to provide an X-Y position sensor 24 which senses the position of the final leg of the beam 12 on each individual die 14 and communicates this information to a computer and mechanical rotator 26 which rotates an optical derotator 30 which orients the initial leg of the beam 12 so that the final leg of the beam 12 will be oriented correctly on the die 14. This requires an algorithm and software to translate the position of the final leg of the beam into information that the computer can use to rotate the derotator 30.

This invention accomplishes the proper orientation of the final leg of the beam 12 relative to each selected position in a passive manner, ie, only optics are used throughout the system. This eliminates the derotator 30, the X-Y position sensor 24, the computer and mechanical rotator 26, and all necessary software and accomplishes the orientation of the beam to its desired orientation automatically.

SUMMARY OF THE INVENTION

The system which accomplishes the automatic orientation of the final leg of the beam comprises articulated arms with a pentaprism (or equivalent 90 degree prism) and a rotator prism, such as a Pechan prism, appropriately located in the beam path in combination with right angle prisms.

As will be apparent to those skilled in the art, the properties of the pentaprism, or equivalent 90 degree prism, and Pechan prism, or equivalent rotator prism, overcome the disorientation of the final leg of the beam caused by the articulated arms when scanning the wafer.

It will also be apparent to those skilled in the art that this system can be used in other applications upon having reviewed the drawings and the subsequent detailed description of the prior art and this invention.

What will become apparent to those skilled in the art is that in those applications where an asymmetric beam must be delivered with the proper orientation over a large area, and where neither the beam source nor the specimen (workpiece) can be moved to accomplish this delivery, an articulated arm device is needed. Given these prerequisites, it becomes clear that this invention may be used in such applications as alpha-numeric printing and machine vision where the workpiece is now brought to the energy source or to the camera.

DETAILED DESCRIPTION

Figure 1:
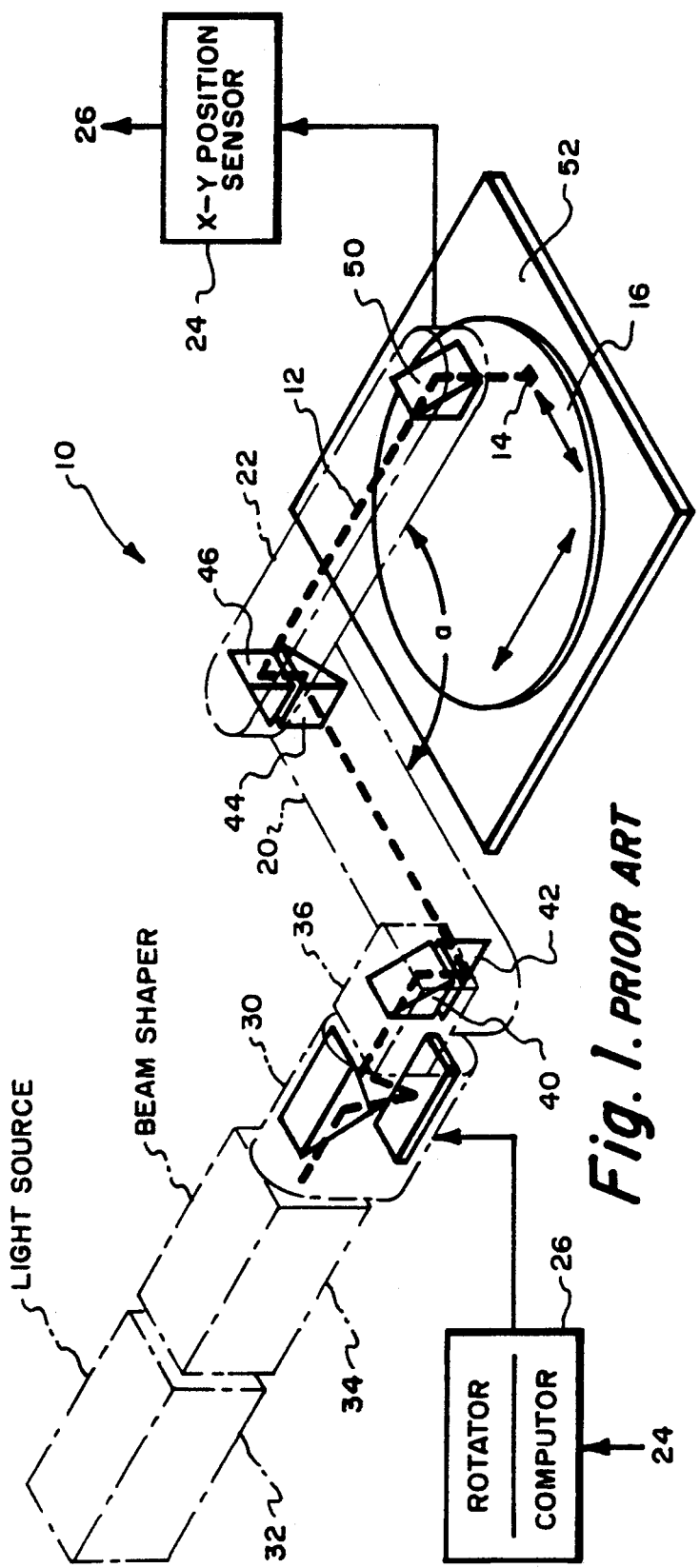
FIG. 1 is a simplified perspective illustration of the prior art beam positioning device.

FIG. 1 is an illustration of the prior art beam positioning device 10 previously referred to and which is now described in more detail.

Figure 2:
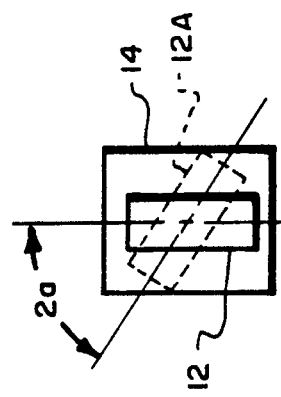
FIG. 2 is an illustration of the disorientation of the beam caused by the rotation of the arms as the beam is directed to a given position.

In this figure, the light source 32, which, in the illustrated embodiment, is an excimer laser (UV) beam generator which directs the laser beam 12 into the beam shaper 34. The beam shaper 34 comprises a series of optical devices designed to form the beam 12 in size and preferred orientation, such as a rectangle or a square as shown in FIG. 2. The output of this beam shaper 34 is directed to the beam derotator 30 having suitable optics to rotate the beam. The output of the beam derotator 30 is directed to a fixed arm 36 which contains a right angle prism 40 located to direct its output vertically downward along the pivotal axis common to the fixed arm 36 and one end of the first movable arm 20. A second right angle prism 42 is located on this same axis between the fixed and movable arms 36 and 20 and directs the beam 12 lengthwise along the first movable arm 20 to a third right angle prism 44 mounted on the other end of the movable arm 20. Prism 44 directs the beam 12 upward to a fourth right angle prism 46 located on the end of the second movable arm 22. Prisms 44 and 46 are located on the axis of rotation common to the movable arms 20 and 22. Prism 46 rotates with the second arm 22 while prism 44 is attached to the first arm 20.

Right angle prism 46 directs the beam 12 lengthwise along the second arm 22 onto a fifth right angle prism 50 which directs the final leg of the beam downward onto the die 14 on the wafer 16 located on a table 52. Thus, both prisms 46 and 50 are fixed relative to the second movable arm 22.

As thus described, it can be seen that the beam scans the semiconductor wafer 16 by the operation of the two movable arms 20 and 22 to selectively irradiate all or part of each individual die in the process of making integrated circuits. In the process, when the beam reaches a selected die, the beam is turned on to irradiate the selected die for a selected length of time and the beam turned off until another selected die is reached. This process continues until all of the selected dies have been irradiated.

As mentioned before, the problem with this device is that the beam 12 rotates about its own axis and is therefore unable to be used as such to scan the wafer 16 and irradiate each selected die as desired. FIG. 2 illustrates this problem. The beam 12, as directed from the beam shaper 34, is shown oriented in a desired vertical position relative to the die 14 but the prisms 42-50 and articulated arms 20 and 22 cause a rotation of the beam 12 which is shown by way of example by the dotted lines 12A in FIG. 2. Experience has shown that these angles of rotation may vary from the desired orientation by as much as 172 degrees; a condition which is unacceptable.

As also mentioned before, the prior art solution to this problem is to use the X-Y position sensor 24 operatively connected to the end of the second arm 22 which senses the position of the beam 12 relative to the wafer 16 as the beam 12 is scanning the wafer 16 to irradiate selected dies 14. This position information from the X-Y position sensor 24 is then sent to the computer and rotator 26 which actuates the derotator 30 located between the beam shaper 34 and the first right angle prism 40. This derotator 30 rotates the first leg of the beam so that the final leg of the beam will be aligned correctly. The use of the X-Y position sensor 24, and computer and rotator 26 to operate the beam derotator 30 requires an algorithm and software.

In an effort to improve and simplify the prior art device, a study of the amount of rotation of the beam 12 from its desired orientation showed that the amount of rotation of the beam was directly related to the angle between the two articulated arms 20 and 22 and that the rotation between the arm 20 and the fixed arm 36 had no effect on the beam rotation. It was also discovered that the angle between the two arms 20 and 22 is one-half the angle between the rotated position of the beam and its desired orientation. FIG. 1 shows angle "a" between the two arms 20 and 22 and angle 2a (a×2) between the beam vertical axis and the beam rotated axis in FIG. 2. With this information, the rotation problem was solved by this invention in the following manner.

Figure 3:
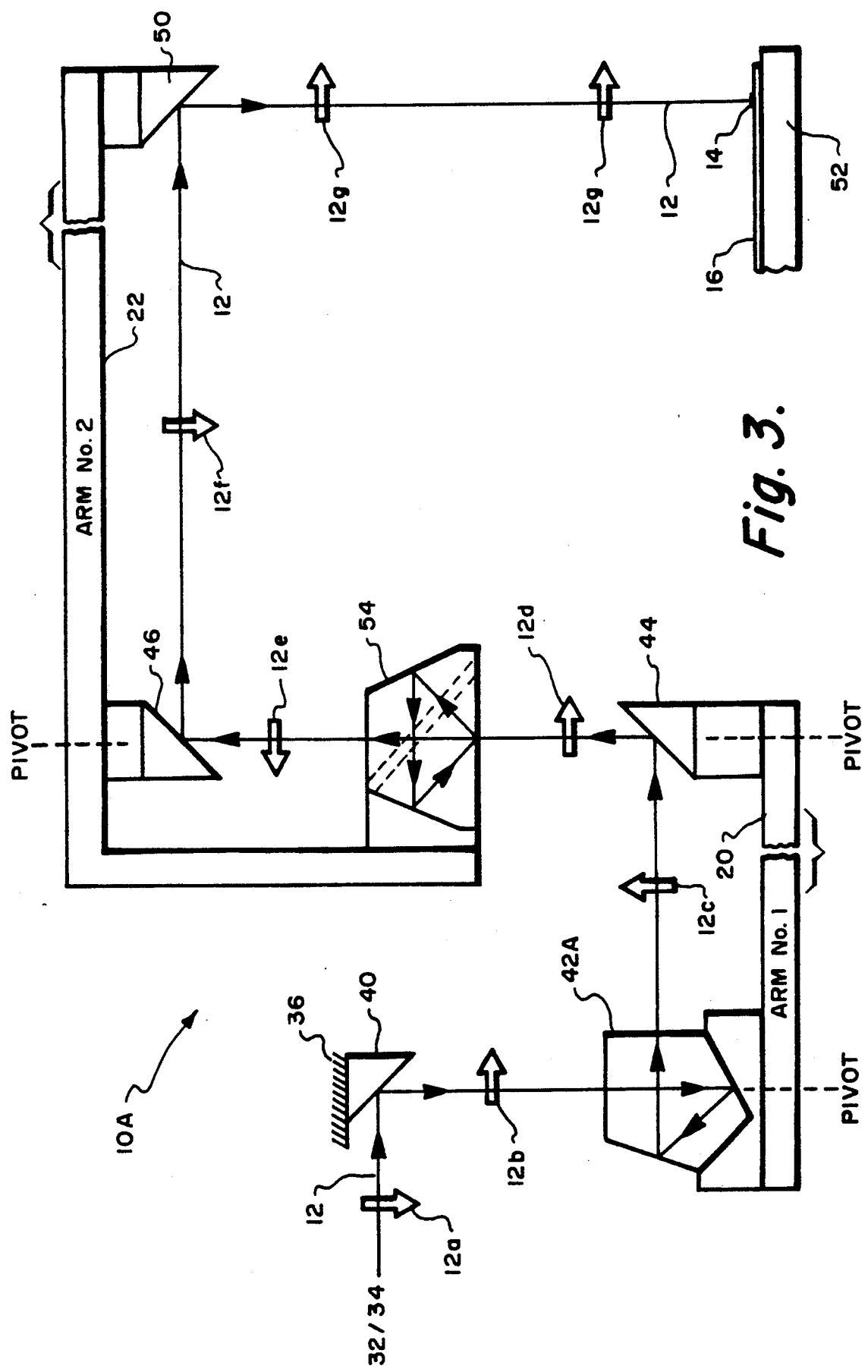
FIG. 3 is an elevation schematic illustration of a beam positioning device constructed in accordance with this invention.

FIG. 3 illustrates a beam positioning system 10A constructed in accordance with this invention. In this figure, those elements having the same function as in FIG. 1 are given the same reference number as in FIG. 1 and those elements which have a similar function are given the same reference number as in FIG. 1 but with a suffix A to simplify and shorten the description of the invention.

As shown in this figure, the second right angle prism 42 was replaced by a pentaprism 42A and a Pechan prism 54 was interposed between the third right angle prism 44 and the fourth right angle prism 46 and fixed relative to the second arm 22. The Pechan prism 54 has the property of rotating an image passing through it at twice the angle that the Pechan prism is rotated. This solved the problem of the angle of rotation of the beam. However, in order to overcome the fact that the Pechan prism also inverts the image, another inversion must be added to, or subtracted from, the optical train. This is accomplished by the pentaprism 42A. Also, the Pechan prism may be replaced by a dove prism, or any other rotator prism, not shown.

Beam orientation arrows 12a–12g show the orientation of the beam as it is directed from the beam shaper 34 onto the wafer 16. It is apparent that beam orientation arrow 12b corresponds in orientation to beam orientation 12g and beam orientation arrow 12b can be considered the preferred beam orientation. What is important is that the beam orientation arrow 12g be parallel to the plane of the wafer 16 and always oriented as shown as the wafer is being scanned. It should be apparent that the beam orientation arrow 12a is oriented by the first prism 40 because of the horizontal disposition of the beam generator 32 and beam shaper 34 and if the beam generator 32 and beam shaper 34 were oriented vertically, the first prism 40 would then be eliminated.

Figure 4:
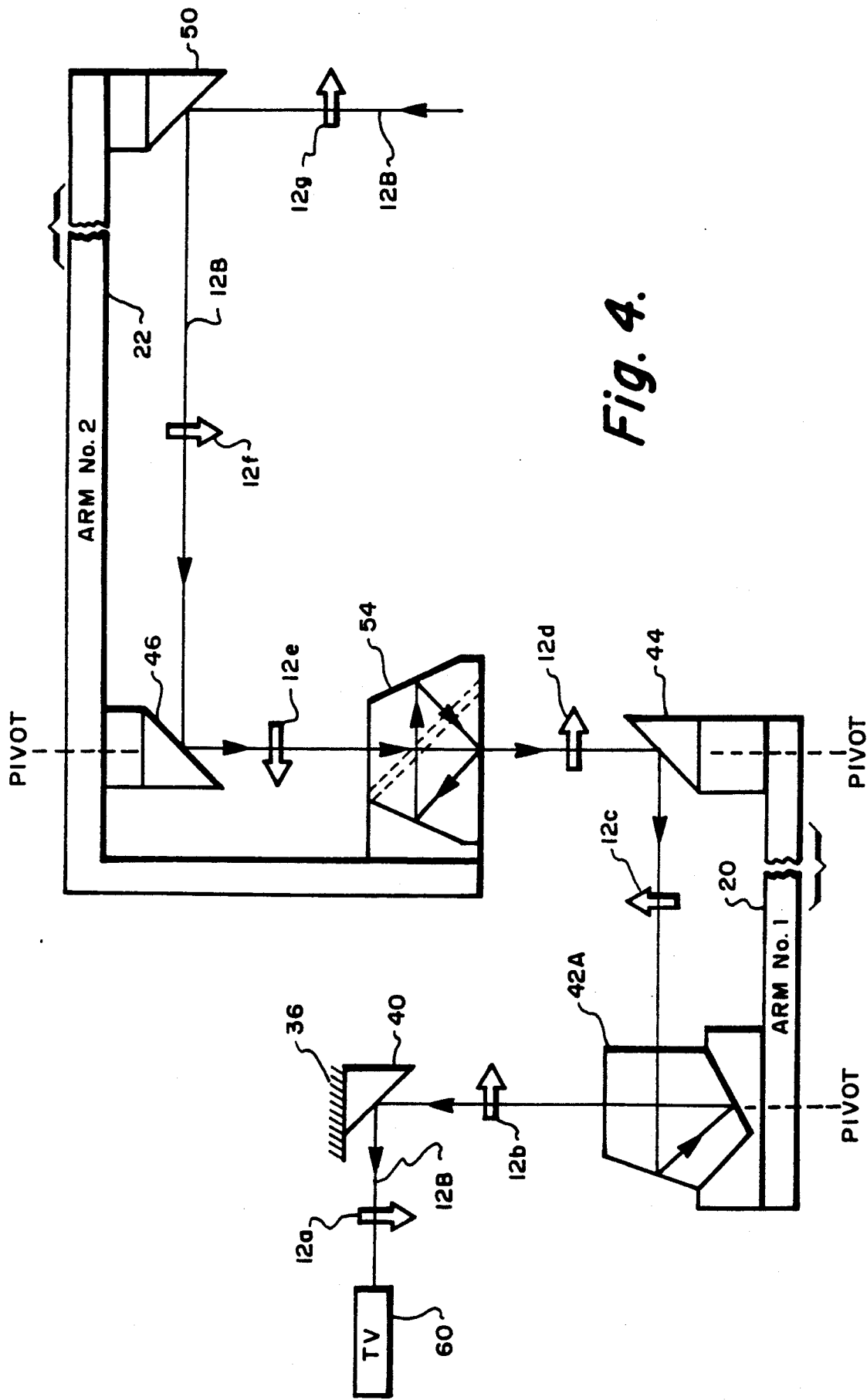
FIG. 4 is an elevation schematic illustration of a beam positioning device of this invention used in another application.

It is apparent that FIGS. 3 and 4 are schematic illustrations without reference to mounting hardware and that the spaces between the arms have been lengthened or shortened, the length of the arms have been shortened, and that the prisms have been enlarged or diminished for clarity. The mounting hardware, the spaces between the prisms and the length of the arms will be selected by those skilled in the art.

Since the Pechan prism, and some other rotator prisms, will handle not only collimated type beams but will also handle converging and diverging beams, this invention has other applications which will be apparent to those skilled in the art.

FIG. 4 shows a TV camera 60 used in a machine vision application, as mentioned above, to cover a large area at high resolution. If the camera were mounted at the end of arm 22, the image displayed on a monitor would tilt as the arms articulate. This invention, used in conjunction with suitable relay optics, will automatically compensate for such image tilt. Again, as in FIG. 3, those elements having the same function as in FIGS. 1 and 3 are given the same reference numbers and those elements having similar functions as in FIGS. 1 and 3 are given the same reference numerals but with a suffix to simplify the description of the invention.

I claim:

1. In a beam positioning device having two articulated arms to direct a beam of light having a preferred orientation from a light source to a selected position with the same preferred orientation, the improvement comprising;
   beam rotating means fixed with respect to one of said arms to rotate said beam,
   right angle prism means mounted on the other of said arms,
   said beam rotating means and said right angle prism means being located to direct said beam along the length of said arms and along the axis of rotation of said arms,
   means to rotate the beam at twice the amount that one arm is rotated with respect to the other arm to maintain the original orientation of said beam at said selected position, and
   means to invert the beam entering the means to rotate the beam.

2. The beam position device as claimed in claim 1 wherein said means to rotate the beam at twice the amount that one arm is rotated relative to the other is located on the axis of said rotation.

3. A beam positioning device as claimed in claim 1 wherein said right angle prism means comprises a pentaprism.

4. The beam positioning device as claimed in claim 2 wherein the means to rotate said beam at twice the amount that one arm is rotated with respect to the other comprises a Pechan prism.

5. The beam positioning device as claimed in claim 2 wherein the means to rotate said beam at twice the amount that one arm is rotated with respect to the other comprises a dove prism.

6. The beam positioning device as claimed in claim 1 further including a right angle prism between said beam rotating means and said right angle prism means to direct said beam along the axis of rotation of said arms.

7. The beam positioning device as claimed in claim 2 wherein still another right angle prism is located between said light source and said beam rotating means to allow said light source to be positioned so that its beam is directed parallel with the movement of said arms.

* * * * *